(12) United States Patent
Faitelson et al.

(10) Patent No.: US 10,037,358 B2
(45) Date of Patent: Jul. 31, 2018

(54) DATA CLASSIFICATION

(75) Inventors: Yakov Faitelson, Elkana (IL); Ohad Korkus, Herzilia (IL); Ophir Kretzer-Katzir, Reut (IL); David Bass, Carmei Yoseph (IL)

(73) Assignee: VARONIS SYSTEMS, INC., New York, NY (US)

( * ) Notice: Subject to any disclaimer, the term of this patent is extended or adjusted under 35 U.S.C. 154(b) by 394 days.

(21) Appl. No.: 13/384,459

(22) PCT Filed: May 26, 2011

(86) PCT No.: PCT/IL2011/000408
§ 371 (c)(1),
(2), (4) Date: Mar. 20, 2012

(87) PCT Pub. No.: WO2011/148376
PCT Pub. Date: Dec. 1, 2011

(65) Prior Publication Data
US 2012/0179681 A1 Jul. 12, 2012

Related U.S. Application Data

(60) Provisional application No. 61/348,862, filed on May 27, 2010.

(51) Int. Cl.
*G06F 17/30* (2006.01)
*G06F 21/62* (2013.01)

(52) U.S. Cl.
CPC .. *G06F 17/30522* (2013.01); *G06F 17/30011* (2013.01); *G06F 17/30731* (2013.01);
(Continued)

(58) Field of Classification Search
CPC ........... G06F 21/6218; G06F 17/30731; G06F 17/30734; G06F 2221/2141; G06F 17/30348; G06F 17/30011
(Continued)

(56) References Cited

U.S. PATENT DOCUMENTS 5,465,387 A 11/1995 Mukherjee
5,889,952 A 3/1999 Hunnicutt et al.
(Continued)

FOREIGN PATENT DOCUMENTS

| CN | 1588889 A | 3/2005 |
| CN | 101583953 | 11/2009 |

(Continued)

OTHER PUBLICATIONS

Notice of Allowance dated Aug. 2, 2013, which issued during the prosecution of U.S. Appl. No. 12/772,450.
(Continued)

*Primary Examiner* — Dangelino N Gortayo
(74) *Attorney, Agent, or Firm* — Ladas & Parry LLP

(57) ABSTRACT

A method for managing data in an enterprise by identifying data of interest from among a multiplicity of data elements in an enterprise, the method including characterizing data of interest at least by at least one non-content based data identifier thereof and at least one access metric thereof, the at least one access metric being selected from data access permissions and actual data access history and selecting data of interest by considering only data elements from among the multiplicity of data elements which have the at least one non-content based data identifier thereof and the at least one access metric thereof.

26 Claims, 3 Drawing Sheets

(52) U.S. Cl.
CPC .... *G06F 17/30867* (2013.01); *G06F 21/6227* (2013.01); *G06F 2221/2141* (2013.01)

(58) Field of Classification Search
USPC ............... 707/781, 783, 722, 737, 769, 609
See application file for complete search history.

(56) References Cited

U.S. PATENT DOCUMENTS

| | | | |
|---|---|---|---|
| 5,899,991 A | 5/1999 | Karch | |
| 6,023,765 A | 2/2000 | Kuhn | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,124,272 B1 | 10/2006 | Kennedy et al. | |
| 7,401,087 B2 | 7/2008 | Copperman et al. | |
| 7,403,925 B2 | 7/2008 | Schlesinger et al. | |
| 7,421,740 B2 | 9/2008 | Fey et al. | |
| 7,505,973 B2 * | 3/2009 | Kapadia | G06F 17/30867 707/999.001 |
| 7,529,748 B2 | 5/2009 | Wen et al. | |
| 7,555,482 B2 | 6/2009 | Korkus | |
| 7,606,801 B2 | 10/2009 | Faitelson et al. | |
| 7,716,240 B2 | 5/2010 | Lim | |
| 7,720,858 B2 * | 5/2010 | Dettinger et al. | 707/769 |
| 7,743,420 B2 | 6/2010 | Shulman et al. | |
| 7,882,098 B2 * | 2/2011 | Prahlad et al. | 707/706 |
| 8,190,638 B2 * | 5/2012 | Giampaolo et al. | 707/785 |
| 8,239,351 B2 * | 8/2012 | Hornqvist | 707/687 |
| 8,239,925 B2 | 8/2012 | Faitelson et al. | |
| 8,250,048 B2 * | 8/2012 | Yalamanchi et al. | 707/705 |
| 8,285,748 B2 * | 10/2012 | Thomas et al. | 707/783 |
| 8,306,999 B2 * | 11/2012 | Gass et al. | 707/781 |
| 8,438,124 B2 * | 5/2013 | Spivack et al. | 706/45 |
| 8,626,803 B2 * | 1/2014 | Hsu et al. | 707/807 |
| 8,898,623 B2 * | 11/2014 | Zhao | G06F 21/604 717/105 |
| 2003/0048301 A1 | 3/2003 | Menninger | |
| 2003/0051026 A1 | 3/2003 | Carter et al. | |
| 2003/0231207 A1 | 12/2003 | Huang | |
| 2004/0030915 A1 | 2/2004 | Sameshima et al. | |
| 2004/0186809 A1 | 9/2004 | Schlesinger et al. | |
| 2004/0205342 A1 | 10/2004 | Roegner | |
| 2004/0249847 A1 | 12/2004 | Wang et al. | |
| 2004/0254919 A1 | 12/2004 | Giuseppini | |
| 2005/0065823 A1 | 3/2005 | Ramraj et al. | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2006/0064313 A1 | 3/2006 | Steinbarth et al. | |
| 2006/0184459 A1 | 8/2006 | Parida | |
| 2006/0184530 A1 | 8/2006 | Song et al. | |
| 2006/0277184 A1 | 12/2006 | Faitelson et al. | |
| 2007/0033340 A1 | 2/2007 | Tulskie et al. | |
| 2007/0061487 A1 | 3/2007 | Moore et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0156659 A1 | 7/2007 | Lim | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0244899 A1 | 10/2007 | Faitelson et al. | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0034402 A1 | 2/2008 | Botz et al. | |
| 2008/0097998 A1 | 4/2008 | Herbach | |
| 2008/0162707 A1 | 7/2008 | Beck et al. | |
| 2008/0172720 A1 | 7/2008 | Botz et al. | |
| 2008/0270462 A1 * | 10/2008 | Thomsen | 707/103 R |
| 2008/0271157 A1 | 10/2008 | Faitelson et al. | |
| 2009/0031418 A1 | 1/2009 | Matsuda et al. | |
| 2009/0077124 A1 | 3/2009 | Spivack et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0157570 A1 | 6/2009 | Pall et al. | |
| 2009/0182715 A1 | 7/2009 | Falkenberg | |
| 2009/0198892 A1 | 8/2009 | Alvarez et al. | |
| 2009/0249290 A1 | 10/2009 | Jenkins et al. | |
| 2009/0249446 A1 | 10/2009 | Jenkins et al. | |
| 2009/0265763 A1 | 10/2009 | Korkus et al. | |
| 2009/0282045 A1 * | 11/2009 | Hsieh et al. | 707/9 |
| 2009/0320088 A1 | 12/2009 | Gill et al. | |
| 2010/0037324 A1 | 2/2010 | Grant et al. | |
| 2010/0100524 A1 | 4/2010 | Bae et al. | |
| 2010/0174731 A1 | 7/2010 | Vermeulen et al. | |
| 2010/0185650 A1 * | 7/2010 | Topatan | G06F 17/30011 707/769 |
| 2010/0257456 A1 | 10/2010 | Lieb et al. | |
| 2010/0299763 A1 | 11/2010 | Marcus et al. | |
| 2011/0010758 A1 | 1/2011 | Faitelson et al. | |
| 2011/0047466 A1 | 2/2011 | Michelman | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0184989 A1 | 7/2011 | Faitelson et al. | |
| 2011/0247074 A1 * | 10/2011 | Manring et al. | 726/26 |
| 2012/0191646 A1 | 7/2012 | Faitelson et al. | |
| 2012/0215780 A1 | 8/2012 | Faitelson et al. | |
| 2012/0221550 A1 | 8/2012 | Korkus et al. | |
| 2012/0291100 A1 | 11/2012 | Faitelson et al. | |

FOREIGN PATENT DOCUMENTS

| | | |
|---|---|---|
| CN | 101681405 | 3/2010 |
| EP | 1 248 178 B1 | 10/2002 |
| WO | 2008/073978 | 6/2008 |
| WO | 2008/111774 | 9/2008 |
| WO | 2011/030324 A1 | 3/2011 |
| WO | 2011/092684 A1 | 8/2011 |
| WO | 2011/092685 A1 | 8/2011 |
| WO | 2011/092686 A1 | 8/2011 |

OTHER PUBLICATIONS

USPTO FOA dated Jul. 2, 2013 in connection with U.S. Appl. No. 13/413,718.

Sahadeb De, et al; "Secure Access Control in Multi-user Geodatabase", available on the Internet at the URL http://www10.giscafe.com. 2005.

Sara C. Madeira, et al; "Biclustering Algorithms for Biological Data Analysis: A Survey", IEEE Transactions on Computational Biology and Bioinformatics, vol. 1, No. 1, Jan.-Mar. 2004, 22 pages.

Sara C. Madeira, "Clustering, Fuzzy Clustering and Biclustering: An Overview", pp. 31-53, Jun. 27, 2003.

Edgar Weippl, et al; "Content-based Management of Document Access", 14th International Conference on Applications of Prolog (INAP), 2001, 9 pages.

Alex Woodie, "Varonis Prevents Unauthorized Access to Unstructured Data", Four Hundred Stuff, vol. 7, No. 29, Jul. 31, 2007, 3 pages.

Genunix,; "Writing Filesystems—VFS and Vnode Interfaces", Oct. 2007, 5 pages.

Findutils: GNU Project—Free Software Foundation (FSF), 3 pages Nov. 2006.

S.R. Kleiman; "Vnodes: An Architecture for Multiple File System Types in Sun UNIX", USENIX Association: Summer Conference Proceedings, Atlanta 1986, 10 pages.

Varonis; A List of Database tables in DatAdvantage 2.7 Feb. 6, 2007.

(56) References Cited

OTHER PUBLICATIONS

Varonis; A List of Database tables in DatAdvantage 3.0, Jun. 20, 2007.
Varonis; DatAdvantage User Guide Version 1.0, Aug. 30, 2005, 71 pages.
Varonis; DatAdvantage User Guide, Version 2.0, Aug. 24, 2006, 118 pages.
Varonis; DatAdvantage User Guide, Version 2.5, Nov. 27, 2006, 124 pages.
Varonis; DatAdvantage User Guide, Version 2.6, Dec. 15, 2006, 127 pages.
Varonis; DatAdvantage User Guide, Version 2.7, Feb. 6, 2007, 131 pages.
Varonis; DatAdvantage User Guide, Version 3.0, Jun. 20, 2007, 153 pages.
Varonis; "Entitlement Reviews: A Practitioner's Guide", Copyright 2007, 16 pages.
Varonis; "Accelerating Audits with Automation: Understanding Who's Accessing Your Unstructured Data", Oct. 8, 2007, 7 pages.
Varonis; "White Paper: The Business Case for Data Governance", Mar. 27, 2007, 8 pages.
German Office Action dated Sep. 14, 2012 Appln. No. 11 2006 001 378.5.
USPTO NFOA dated Feb. 12, 2008 in connection with U.S. Appl. No. 11/258,256.
USPTO FOA dated Aug. 1, 2008 in connection with U.S. Appl. No. 11/258,256.
USPTO NFOA dated Oct. 31, 2008 in connection with U.S Appl. No. 11/635,736.
USPTO NFOA dated Dec. 14, 2010 in connection with U.S. Appl. No. 11/786,522.
USPTO NFOA dated Mar. 13, 2012 in connection with U.S. Appl. No. 11/786,522.
USPTO NFOA dated Jul. 9, 2010 in connection with U.S. Appl. No. 11/789,884.
USPTO FOA dated Dec. 14, 2010 in connection with U.S. Appl. No. 11/789,884.
USPTO NFOA dated Sep. 16, 2010 in connection with U.S. Appl. No. 11/871,028.
USPTO FOA dated Apr. 28, 2011 in connection with U.S. Appl. No. 11/871,028.
USPTO NFOA dated Aug. 28, 2012 in connection with U.S. Appl. No. 12/673,691.
USPTO NFOA dated Jul. 5, 2012 in connection with U.S. Appl. No. 12/772,450.
USPTO FOA dated Jan. 30, 2013 in connection with U.S. Appl. No. 12/772,450.
USPTO NFOA dated Jun. 22, 2012 in connection with U.S. Appl. No. 12/814,807.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO RR dated Nov. 21, 2012 in connection with U.S. Appl. No. 13/106,023.
USPTO NFOA dated Jan. 16, 2013 in connection with U.S. Appl. No. 13/413,748.
IPRP dated Jul. 31, 2012 PCT/IL2011/000065.
IPRP dated Jul. 31, 2012 PCT/IL2011/000066.
IPRP dated Mar. 13, 2012 PCT/IL2010/000069.
IPRP dated Jul. 31, 2012 PCT/IL2011/0000078.
ISR and Written Opinion dated May 23, 2011, PCT/IL11/00065.
ISR and Written Opinion dated Jun. 14, 2011, PCT/IL11/00066.
ISR and Written Opinion dated May 20, 2010, PCT/IL10/00069.
ISR and Written Opinion dated May 24, 2011 PCT/IL11/00077.
ISR and Written Opinion dated May 25, 2011, PCT/IL11/00078.
ISR and Written Opinion dated Nov. 15, 2011, PCT/IL11/000408.
ISR and Written Opinion dated Apr. 13, 2012 PCT/IL11/00902.
ISR and Written Opinion dated Oct. 1, 2012 PCT/IL2012/000240.
U.S. Appl. No. 12/673,691, filed Feb. 16, 2010 published as US2012/0221550.
U.S. Appl. No. 60/688,486, filed Jun. 7, 2005.
U.S. Appl. No. 61/240,726, filed Sep. 9, 2009.
An English Translation of an Office Action dated Jan. 23, 2015, which issued during the prosecution of Chinese Patent Application No. 211800366741.
An English Translation of an Office Action dated Oct. 10, 2015, which issued during the prosecution of Chinese Patent Application No. 201180036674.1.

* cited by examiner

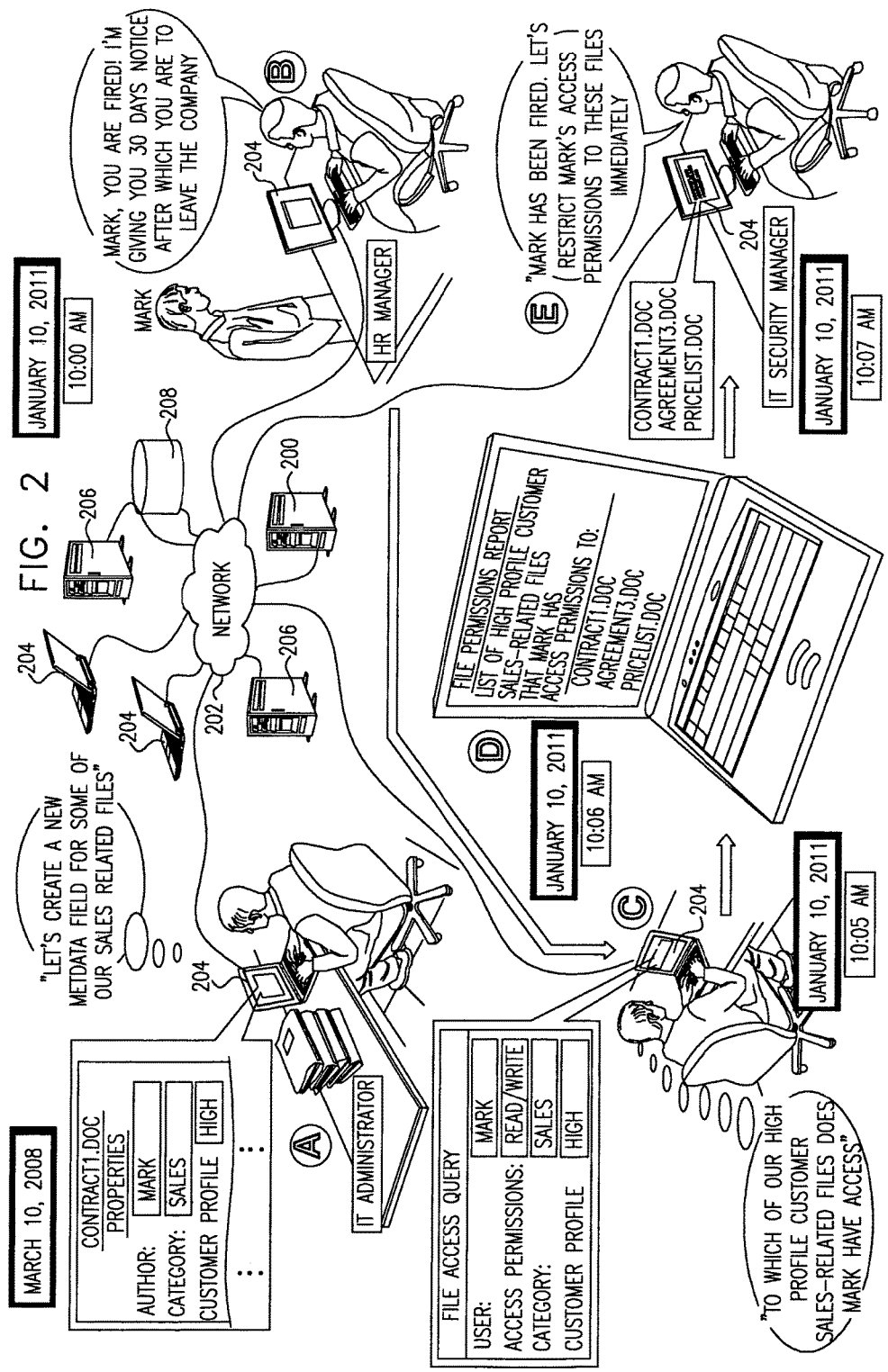

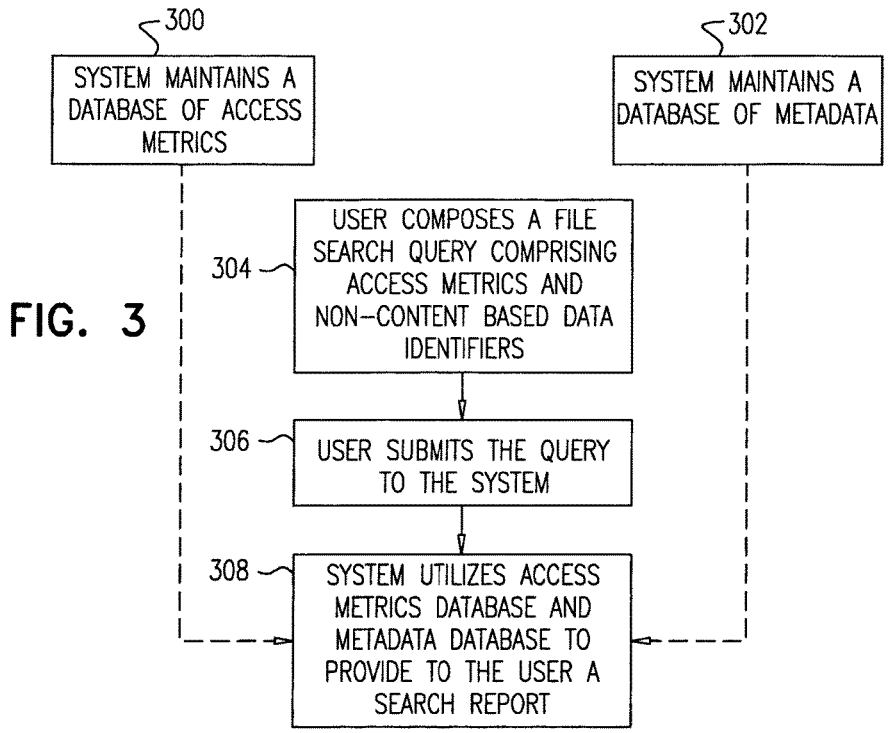

DATA CLASSIFICATION

REFERENCE TO RELATED APPLICATIONS

Reference is made to U.S. Provisional Patent Application Ser. No. 61/348,862, filed May 27, 2010 and entitled "MANAGEMENT OF CHANGES IN ORGANIZATIONAL DATA", the disclosure of which is hereby incorporated by reference and priority of which is hereby claimed pursuant to 37 CFR 1.78(a) (4) and (5)(i).

Reference is also made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to U.S. patent application Ser. No. 13/106,023, filed May 12, 2011, and entitled "AUTOMATIC RESOURCE OWNERSHIP ASSIGNMENT SYSTEM AND METHOD", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0060916 and 2011/0061111; and U.S. patent application Ser. No. 12/673,691.

FIELD OF THE INVENTION

The present invention relates to improved systems and methodologies for data classification.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos. 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for data classification.

There is thus provided in accordance with a preferred embodiment of the present invention a method for managing data in an enterprise by identifying data of interest from among a multiplicity of data elements in an enterprise, the method including characterizing data of interest at least by at least one non-content based data identifier thereof and at least one access metric thereof, the at least one access metric being selected from data access permissions and actual data access history and selecting data of interest by considering only data elements from among the multiplicity of data elements which have the at least one non-content based data identifier thereof and the at least one access metric thereof.

Preferably, the characterizing the data of interest includes characterizing data of interest also by at least one content based data identifier thereof and the selecting data of interest includes considering only data elements which have the at least one content based data identifier thereof.

In accordance with a preferred embodiment of the present invention the considering includes defining a field of search in accordance with the at least one access metric and searching within the field of search based on the at least one non-content based data identifier. Alternatively, the considering includes defining a field of search in accordance with the at least one access metric multiple times and searching within the field of search multiple times, wherein the at least one access metric is different at least some of the multiple times.

Preferably, the at least one access metric is a dynamic metric which changes over time during operation of the enterprise.

In accordance with a preferred embodiment of the present invention the method for managing data in an enterprise by identifying data of interest from among a multiplicity of data elements in an enterprise also includes automatically redefining the field of search in accordance with the at least one access metric multiple times and searching within the field of search multiple times, where the at least one access metric is different at least some of the multiple times. Additionally, the searching includes searching only within those portions of the field of search that have been modified or added as the result of redefining the field of search in accordance with changes in the at least one access metric.

In accordance with a preferred embodiment of the present invention the method for managing data in an enterprise by identifying data of interest from among a multiplicity of data elements in an enterprise also includes noting the current status of data elements that have been modified, added or removed in accordance with changes in the at least one access metric.

Preferably, the searching is prioritized at least in accordance with at least one access metric related prioritization characteristic. Additionally, results of the searching are ordered at least in accordance with at least one access metric related prioritization characteristic.

In accordance with a preferred embodiment of the present invention the selecting the data of interest by considering only data elements which have the at least one non-content based data identifier thereof and the at least one access metric thereof from among the multiplicity of data elements includes searching for data elements which have the at least one non-content based data identifier thereof, separately from the searching for data elements which have the at least one non-content based data identifier thereof, identifying data elements from among the multiplicity of data elements in accordance with the at least one access metric and combining results of the searching and the identifying. In accordance with a preferred embodiment of the present invention, the searching and the identifying are performed by separate entities.

Preferably, the method for managing data in an enterprise by identifying data of interest from among a multiplicity of data elements in an enterprise also includes maintaining an access metrics database. In accordance with a preferred embodiment of the present invention the method for managing data in an enterprise by identifying data of interest from among a multiplicity of data elements in an enterprise also includes maintaining a metadata database.

Preferably, the method for managing data in an enterprise by identifying data of interest from among a multiplicity of data elements in an enterprise also includes, responsive to the identification of data elements of interest, modification of access permissions to at least one of the data elements of interest.

There is also provided in accordance with another preferred embodiment of the present invention a system for managing data in an enterprise by identifying data of interest from among a multiplicity of data elements in an enterprise, the system including query generation functionality operable for characterizing data of interest at least by at least one non-content based data identifier thereof and at least one access metric thereof, the at least one access metric being selected from data access permissions and actual data access history and query resolution functionality operable for selecting data of interest by considering only data elements from among the multiplicity of data elements which have the at least one non-content based data identifier thereof and the at least one access metric thereof.

Preferably, the query generation functionality is also operable for characterizing data of interest by at least one content based data identifier thereof and the query resolution functionality is also operable for selecting data of interest by considering only data elements which have the at least one content based data identifier thereof.

In accordance with a preferred embodiment of the present invention the considering includes defining a field of search in accordance with the at least one access metric and searching within the field of search based on the at least one non-content based data identifier. Alternatively, the considering includes defining a field of search in accordance with the at least one access metric multiple times and searching within the field of search multiple times, wherein the at least one access metric is different at least some of the multiple times.

Preferably, the at least one access metric is a dynamic metric which changes over time during operation of the enterprise.

In accordance with a preferred embodiment of the present invention the considering also includes automatically redefining the field of search in accordance with the at least one access metric multiple times and searching within the field of search multiple times, wherein the at least one access metric is different at least some of the multiple times. Additionally, the searching includes searching only within those portions of the field of search that have been modified or added as the result of redefining the field of search in accordance with changes in the at least one access metric.

Preferably, the searching includes noting the current status of data elements that have been modified, added or removed in accordance with changes in the at least one access metric. In accordance with a preferred embodiment of the present invention the searching is prioritized at least in accordance with at least one access metric related prioritization characteristic. Additionally, results of the searching are ordered at least in accordance with at least one access metric related prioritization characteristic.

Preferably, the query resolution functionality is also operable for searching for data elements which have the at least one non-content based data identifier thereof, separately from the searching for data elements which have the at least one non-content based data identifier thereof, identifying data elements from among the multiplicity of data elements in accordance with the at least one access metric and combining results of the searching and the identifying. In accordance with a preferred embodiment of the present invention the searching and the identifying are performed by separate entities.

In accordance with a preferred embodiment of the present invention the system for managing data in an enterprise by identifying data of interest from among a multiplicity of data elements in an enterprise also includes access metrics collection functionality and an access metrics database.

Preferably, the system for managing data in an enterprise by identifying data of interest from among a multiplicity of data elements in an enterprise also includes metadata collection functionality and a metadata database.

In accordance with a preferred embodiment of the present invention the system for managing data in an enterprise by identifying data of interest from among a multiplicity of data elements in an enterprise also includes access permissions modification functionality which is operative, responsive to the identification of data elements of interest, to modify access permissions to at least one of the data elements of interest.

BRIEF DESCRIPTION OF THE DRAWINGS

The present invention will be understood and appreciated more fully from the following detailed description, taken in conjunction with the drawings in which:

FIG. 2 is a simplified pictorial illustration of another example of the operation of a data classification system;

FIG. 3 is a simplified flowchart indicating steps in the operation of the data classification system of FIGS. 1 & 2; and FIG. 4 is a simplified block diagram illustration of the data classification system of FIGS. 1-3.

DETAILED DESCRIPTION OF PREFERRED EMBODIMENTS

Figure 1:
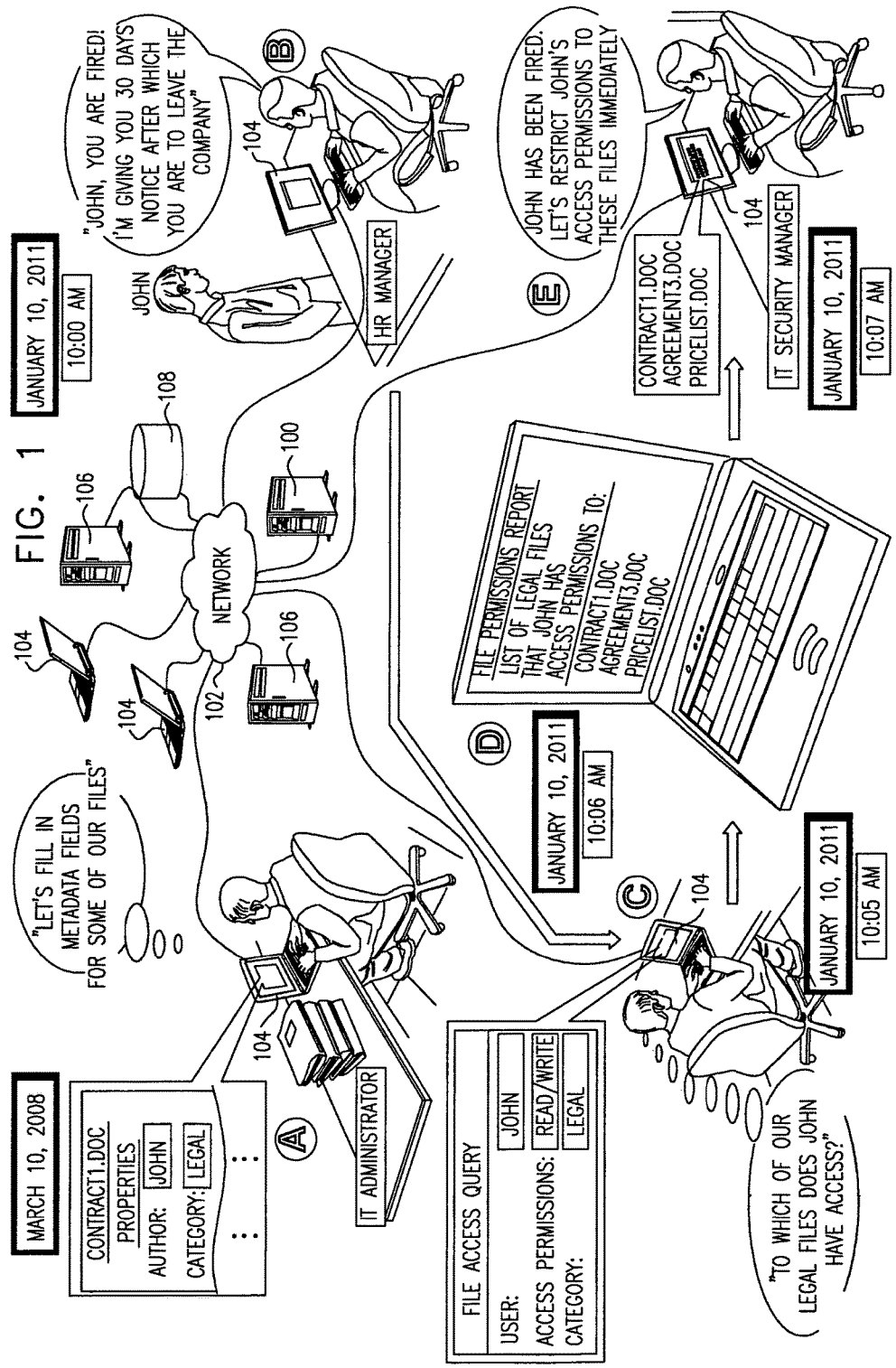
FIG. 1 is a simplified pictorial illustration of an example of the operation of a data classification system constructed and operative in accordance with a preferred embodiment of the present invention.

Reference is now made to FIG. 1, which is a simplified pictorial illustration of one example of the operation of a data classification system constructed and operative in accordance with a preferred embodiment of the present invention. The data classification system of FIG. 1 is preferably suitable for operating in an enterprise computer network including multiple disparate clients, data elements, computer hardware resources and computer software resources, and preferably includes data characterization functionality and data selection functionality operative to characterize and select data based on content and non-content based data identifiers and on access metrics.

The operation of the data classification system preferably includes characterizing data of interest at least by at least one non-content based data identifier thereof and at least one access metric thereof, the at least one access metric being selected from data access permissions and actual data access history, and selecting data of interest by considering only data elements from among the multiplicity of data elements which have the at least one non-content based data identifier thereof and the at least one access metric thereof.

The term "non-content based data identifier" is used throughout to refer to metadata associated with a data element. The metadata may include any data element characteristic associated with the data element such as, for example, file type, author, category and language. It is appreciated that the metadata may be predefined characteristics provided by the system which hosts the data elements or user-defined characteristics. It is appreciated that metadata may be manually associated with a data element without having to actually access or modify the content of the data element.

As shown in FIG. 1, the data classification system typically resides on a server 100 which is connected to an enterprise computer network 102 which preferably includes multiple disparate clients 104, servers 106 and data storage resources 108. Typically, data elements such as computer files reside on servers 106 and data storage resources 108 and are accessible to users of network 102 in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also crawls over at least a subset of all data elements in the enterprise and maintains a database of metadata associated with each data element of the subset of data elements.

As seen in FIG. 1, on a particular day, such as on Mar. 10, 2008, an IT Security Manager of an enterprise network decides to assign values to metadata fields associated with at least some of the files on the network. For example, the IT Security Manager may choose to assign values to the predefined 'author' field and 'category' field. It is appreciated that metadata may be assigned to individual files at the time of file creation or at any other time thereafter.

At a later date, such as on Jan. 10, 2011, the HR Manager of the enterprise decides to terminate the employment of John, an enterprise employee, and to give John thirty days notice before the termination will take effect.

In accordance with company policy, the IT Security Manager immediately queries the system in order to ascertain to which of the files having the predefined 'category' metadata field set to "legal" John has access permissions. Preferably, the IT Security Manager receives a response from the system to his query in near real time, whereby the response includes a list of legal files to which John has access permissions. The IT Security Manager may then restrict John's access permissions to the legal files, in anticipation of John's termination of employment.

It is appreciated that maintenance by the system of a database of actual access and access permissions of every user to every data element in the enterprise and of a database of metadata associated with each of the data elements in the enterprise is operative to enable the system to provide near real time responses to queries to the system.

Reference is now made to FIG. 2, which is a simplified pictorial illustration of another example of the operation of a data classification system. The data classification system of FIG. 2 is preferably suitable for operating in an enterprise computer network including multiple disparate clients, data elements, computer hardware resources and computer software resources, and preferably includes data characterization functionality and data selection functionality operative to characterize and select data based on content and non-content based data identifiers and on access metrics.

The operation of the data classification system preferably includes characterizing the data of interest at least by at least one non-content based data identifier thereof and at least one access metric thereof, the at least one access metric being selected from data access permissions and actual data access history, and selecting the data of interest by considering only data elements which have the at least one non-content based data identifier thereof and the at least one access metric thereof from among the multiplicity of data elements.

As shown in FIG. 2, the data classification system typically resides on a server 200 which is connected to an enterprise computer network 202 which preferably includes multiple disparate clients 204, servers 206 and data storage resources 208. Typically, data elements such as computer files reside on servers 206 and data storage resources 208 and are accessible to users of network 202 in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also crawls over at least a subset of all data elements in the enterprise and maintains a database of metadata associated with each data element of the subset of data elements.

As seen in FIG. 2, on a particular day, such as on Mar. 10, 2008, an IT Security Manager of an enterprise network decides to assign values to metadata fields associated with at least some of the files on the network. For example, the IT Security Manager may choose to assign values to the predefined 'author' field and 'category' field. Additionally, the IT Security Manager decides to define a new 'customer profile' metadata field for all sales related files. It is appreciated that metadata may be assigned to individual files at the time of file creation or at any other time thereafter.

At a later date, such as on Jan. 10, 2011, the HR Manager of the enterprise decides to terminate the employment of Mark, an enterprise employee, and to give Mark thirty days notice before the termination will take effect.

In accordance with company policy, the IT Security Manager immediately queries the system in order to ascertain to which of the files having the predefined 'category' metadata field set to "sales" and having the user-defined 'customer profile' field set to "high" Mark has access permissions. Preferably, the IT Security Manager receives a response from the system to his query in near real time, whereby the response includes a list of high-profile customer sales-related files to which Mark has access permissions. The IT Security Manager may then restrict Mark's access permissions to the high-profile customer sales-related files, in anticipation of Mark's termination of employment.

It is appreciated that maintenance by the system of a database of actual access and access permissions of every user to every data element in the enterprise and of a database of metadata associated with each of the data elements in the enterprise is operative to enable the system to provide near real time responses to queries to the system.

Reference is now made to FIG. 3, which is a simplified flowchart indicating steps in the operation of the data classification system of FIGS. 1 & 2. As shown in FIG. 3, the system preferably maintains a database of access metrics which include actual access and access permissions of every user to every data element in the enterprise (300). The system also preferably crawls over at least a subset of all data elements in the enterprise and maintains a database of metadata associated with each of the subset of data elements (302).

As shown in FIG. 3, a user of the data classification system composes a file search query to be submitted to the system (304). The search query preferably comprises a request for a list of files having at least one search access metric and at least one search non-content based data identifier associated therewith. The user then submits the query to the system (306). It is appreciated that the search query may be redefined in accordance with the at least one access metric multiple times and executed multiple times, wherein the at least one access metric is different at least some of the multiple times.

Upon receiving the search query from the user, the system utilizes the database of access metrics and the database of metadata to provide to the user a search report which comprises a list of files having the at least one search access metric and the at least one search non-content based data identifier associated therewith (308).

Reference is now made to FIG. 4, which is a simplified block diagram illustration of the data classification system of FIGS. 1-3. As shown in FIG. 4, the system 400 comprises access metrics collection functionality 402 and metadata collection functionality 404. As described hereinabove regarding FIGS. 1-3, access metrics collection functionality 402 preferably stores access metrics in an access metrics database 406 and metadata collection functionality 404 preferably stores file metadata in metadata database 408.

It is appreciated that the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Query generation functionality 410 is preferably provided to allow a user to compose a file search query to be submitted to query resolution functionality 412. As shown in FIG. 4, query resolution functionality 412 is operative to utilize access metrics database 406 and metadata database 408 to execute the file search query and to provide the user with the resulting search report in near real time.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A method for managing data elements in an enterprise file system, said data elements being characterized at least by metadata thereof and by at least one access metric thereof, said at least one access metric including actual access, the method comprising:
    specifying, by an operator, specific metadata and at least one specific access metric to identify data elements of interest from among a multiplicity of said data elements in said enterprise file system; and
    classifying said data elements of interest by considering data elements in said enterprise file system which have said specific metadata and said at least one specific access metric, which includes actual access including at least one of reading, writing, opening, creating and removing said data elements, said classifying including:
        searching for data elements which have said specific metadata;
        separately from said searching for data elements which have said specific metadata, identifying data elements from among said multiplicity of data elements in accordance with said at least one specific access metric; and
        combining results of said searching and said identifying.

2. The method for managing data elements in an enterprise file system according to claim 1 and also comprising:
    specifying, by said operator, at least one specific content based data identifier; and wherein
    said classifying said data elements of interest includes considering only data elements which have said at least one specific content based data identifier.

3. The method for managing data elements in an enterprise file system according to claim 1 and wherein said considering comprises:
    defining a field of search in accordance with said at least one specific access metric multiple times and searching within said field of search multiple times, wherein said at least one specific access metric is different at least some of said multiple times.

4. The method for managing data elements in an enterprise file system according to claim 1 and wherein said at least one specific access metric is a dynamic metric which changes over time during operation of the enterprise.

5. The method for managing data elements in an enterprise file system according to claim 1 and wherein said searching comprises searching only within those portions of said field of search that have been modified or added as the result of redefining said field of search in accordance with changes in said at least one specific access metric.

6. The method for managing data elements in an enterprise file system according to claim 1 and also comprising noting the current status of data elements that have been modified, added or removed in accordance with changes in said at least one specific access metric.

7. The method for managing data elements in an enterprise file system according to claim 1 and wherein said searching is prioritized at least in accordance with at least one specific access metric related prioritization characteristic.

8. The method for managing data elements in an enterprise file system according to claim 7 and wherein results of said searching are ordered at least in accordance with at least one specific access metric related prioritization characteristic.

9. The method for managing data elements in an enterprise file system according to claim 1 and wherein said searching and said identifying are performed by separate entities.

10. The method for managing data elements in an enterprise file system according to claim 1 and also comprising maintaining an access metrics database.

11. The method for managing data elements in an enterprise file system according to claim 1 and also comprising maintaining a metadata database.

12. The method for managing data elements in an enterprise file system according to claim 1 and also comprising, responsive to classifying said data elements of interest, modification of access permissions to at least one of said data elements of interest.

13. The method for managing data elements in an enterprise file system according to claim 1 and also comprising automatically redefining said field of search in accordance with said at least one specific access metric multiple times and searching within said field of search multiple times, wherein said at least one specific access metric is different at least some of said multiple times.

14. A system for managing data elements in an enterprise file system, said data elements being characterized at least by metadata thereof and by at least one access metric thereof, said at least one access metric including actual access, the system comprising:
   a computer including:
      a processor;
      a memory; and
      a non-transitory, tangible computer-readable medium in which computer program instructions are stored, which instructions, when read by said computer, cause the computer to enable efficient management of data in said enterprise;
   query generation functionality operable for facilitating specifying, by an operator, specific metadata and at least one specific access metric to identify data elements of interest from among a multiplicity of said data elements in said enterprise file system; and
   query resolution functionality operable for classifying said data elements of interest by considering data elements in said enterprise file system which have said specific metadata and said at least one specific access metric, which includes actual access including at least one of reading, writing, opening, creating and removing said data elements, said classifying including:
      searching for data elements which have said specific metadata;
      separately from said searching for data elements which have said specific metadata, identifying data elements from among said multiplicity of data elements in accordance with said at least one specific access metric; and
      combining results of said searching and said identifying.

15. The system for managing data elements in an enterprise file system, said data elements being characterized at least by metadata thereof and by at least one access metric thereof according to claim 14 and wherein:
   said query generation functionality is also operable for facilitating specifying, by said operator, at least one specific content based data identifier; and
   said query resolution functionality is also operable for classifying data elements of interest by considering data elements which have said at least one content based data identifier.

16. The system for managing data elements in an enterprise file system, said data elements being characterized at least by metadata thereof and by at least one access metric thereof according to claim 14 and wherein said considering comprises:
   defining a field of search in accordance with said at least one access metric multiple times and searching within said field of search multiple times, wherein said at least one specific access metric is different at least some of said multiple times.

17. The system for managing data elements in an enterprise file system, said data elements being characterized at least by metadata thereof and by at least one access metric thereof according to claim 14 and wherein said at least one specific access metric is a dynamic metric which changes over time during operation of the enterprise.

18. The system for managing data elements in an enterprise file system, said data elements being characterized at least by metadata thereof and by at least one access metric thereof according to claim 14 and wherein said searching comprises searching only within those portions of said field of search that have been modified or added as the result of redefining said field of search in accordance with changes in said at least one specific access metric.

19. The system for managing data elements in an enterprise file system, said data elements being characterized at least by metadata thereof and by at least one access metric thereof according to claim 14 and wherein said searching comprises noting the current status of data elements that have been modified, added or removed in accordance with changes in said at least one specific access metric.

20. The system for managing data elements in an enterprise file system, said data elements being characterized at least by metadata thereof and by at least one access metric thereof according to claim 14 and wherein said searching is prioritized at least in accordance with at least one specific access metric related prioritization characteristic.

21. The system for managing data elements in an enterprise file system, said data elements being characterized at least by metadata thereof and by at least one access metric thereof according to claim 20 and wherein results of said searching are ordered at least in accordance with at least one specific access metric related prioritization characteristic.

22. The system for managing data elements in an enterprise file system, said data elements being characterized at least by metadata thereof and by at least one access metric thereof according to claim 14 and wherein said searching and said identifying are performed by separate entities.

23. The system for managing data elements in an enterprise file system, said data elements being characterized at least by metadata thereof and by at least one access metric thereof according to claim 14 and also comprising access metrics collection functionality and an access metrics database.

24. The system for managing data elements in an enterprise file system, said data elements being characterized at least by metadata thereof and by at least one access metric thereof according to claim 14 and also comprising metadata collection functionality and a metadata database.

25. The system for managing data elements in an enterprise file system, said data elements being characterized at least by metadata thereof and by at least one access metric thereof according to claim 14 and also comprising access permissions modification functionality which is operative, responsive to classifying data elements of interest, to modify access permissions to at least one of said data elements of interest.

26. The system for managing data elements in an enterprise file system according to claim 14 and wherein said query generation functionality is also operable for automatically redefining said field of search in accordance with said at least one specific access metric multiple times and searching within said field of search multiple times, wherein said at least one specific access metric is different at least some of said multiple times.

* * * * *